United States Patent [19]

Nakamichi

[11] Patent Number: 5,077,712
[45] Date of Patent: Dec. 31, 1991

[54] DAT SYSTEM

[75] Inventor: Niro Nakamichi, South Laguna, Calif.

[73] Assignee: Nakamichi Company, Tokyo, Japan

[21] Appl. No.: 336,427

[22] Filed: Apr. 11, 1989

[30] Foreign Application Priority Data

Apr. 12, 1988 [JP] Japan .................................. 63-89602

[51] Int. Cl.⁵ .......................... H04B 1/00; H04B 1/03; H04B 1/08; H05K 11/02
[52] U.S. Cl. ........................................ 369/6; 455/346; 369/12
[58] Field of Search .......................... 369/6, 7, 69, 1, 2, 369/10, 11, 75.1, 76; 360/55, 32, 61; 455/344, 345, 346, 347, 348

[56] References Cited

U.S. PATENT DOCUMENTS

| | | | |
|---|---|---|---|
| 2,866,891 | 12/1958 | Princ | 455/346 |
| 3,103,630 | 9/1963 | Pitts | 455/346 |
| 4,100,372 | 7/1978 | Hypolite | 369/12 |
| 4,623,992 | 11/1986 | Kurosaki | 369/6 |
| 4,628,373 | 12/1986 | Takahashi | 360/32 |
| 4,870,702 | 9/1989 | Azzouni | 455/346 |
| 4,903,025 | 2/1990 | Nakamichi | 360/61 |

FOREIGN PATENT DOCUMENTS

| | | | |
|---|---|---|---|
| 8603080 | 5/1986 | France | 455/346 |
| 0154601 | 9/1982 | Japan | 369/6 |

OTHER PUBLICATIONS

Stereo Review, Nakamichi advertisement Apr. 1989, pp. 68, 69.
Stereo Review, Coustic advertisment Jan. 1989, p. 57.
Stereo Review, New Products (Sony) Mar. 1983, p. 14.

*Primary Examiner*—Stuart S. Levy
*Assistant Examiner*—John C. Pokotylo
*Attorney, Agent, or Firm*—Dann, Dorfman, Herrell and Skillman

[57] ABSTRACT

DAT system includes a transportable unit provided with a recording/reproducing magnetic head operatable with respect to a DAT cassette tape loaded thereto. The unit is fittable to a sleeve secured to an opening of a dashboard of an automobile, in which case the system is operatable only to reproduce the digital signal beforehand recorded on the DAT cassette tape. There is also provided a cabinet particularly adapted to be installed in home, having a mechanism cooperated with the transportable unit to perform recording operation as well as reproducing operation, when the unit is fitted to the cabinet.

6 Claims, 4 Drawing Sheets

DAT SYSTEM

Field of the Invention

This invention relates to a DAT (digital audio tape) system comprising a transportable DAT unit which is adapted to perform the reproducing operation when mounted in an automobile and may be used as a reproducing and recording apparatus when fitted into a cabinet designed particularly for home uses.

BACKGROUND OF THE INVENTION

Radio receivers and cassette decks have been employed as vehicle audio instruments for many years. As a result of the recent development of digital audio instruments such as CD (compact disc) and DAT players, there is an increasing demand to install these digital audio instruments for vehicle use. Usually no recording capability is desired for the vehicle audio instruments so that the conventional DAT players adapted to be mounted on the automobiles are provided with no recording mechanism.

With the conventional DAT system for vehicle use, the drivers and/or passengers can enjoy musical and instrumental sources that have been recorded and programmed on a DAT cassette tape. This means that, in order to listen a DAT source of private collection which is itself not on sale, it would be necessary to have another DAT unit equipped with recording mechanism and program the favorite source on a DAT cassette tape with the DAT unit. Such DAT unit might be installed in a home and usually would be equipped with reproducing mechanism as well. Accordingly, providing a similar reproducing mechanism both for the vehicle DAT player and the household DAT reproducing-/recording apparatus, could be considered wasteful.

Summary of the Invention

It is therefore an object of the invention to provide a novel DAT system capable of obviating the disadvantages of the prior art one.

Another object of the invention is to provide a novel DAT system including a transportable unit equipped with a mechanism for reproducing a digital signal recorded on a DAT cassette tape loaded therein, said unit being cooperated with a second unit to become operable as a DAT reproducing and recording apparatus.

In accordance with an aspect of the invention there is provided a first, transportable unit including a magnetic head for recording a digital signal on a DAT cassette tape as well as for reproducing the digital signal recorded on the DAT cassette tape, a digital/analog converter for converting the reproduced digital signal to an analog signal, an analog signal output terminal for outputting the converted analog signal and connectable to speaker means, and a digital signal input terminal connectable to a digital signal output terminal of a separate second unit equipped with a recording mechanism for recording operation on the DAT cassette tape. The digital signal is processed by a signal processor mounted in the first unit to become suitable to the recording/reproducing operation. The operation of the signal processor will be controlled by a central processing unit (CPU) provided in the first unit.

The second unit comprises a cabinet adapted to accommodate the first unit. The second unit includes a analog/digital converter for converting an analog signal input through an analog signal input terminal to a digital signal, a digital input/output (I/O) for transmitting and receiving the digital signal and a central processing unit (CPU) for controlling operation of the digital I/O.

There is also provided means for connecting the first and second units whereby the digital signal can be reproduced and/or recorded on the DAT cassette tape by the magnetic head in the first unit, when the first unit is fitted to the cabinet of the second unit. By the connecting means, the digital signal can be transmitting and received between the signal processor in the first unit and the digital I/O in the second unit for recording/reproducing operation. The analog signal output from the D/A converter in the first unit passes through the second unit and output therefrom for reproducing operation. CPU's in the first and second units will be connected to each other when the first unit is fitted to the second unit.

With the first unit is used alone, the analog signal output from the D/A converter is connectable to speaker units.

BRIEF DESCRIPTION OF THE DRAWINGS

Further objects and advantages of the invention can be fully understood from the following description when read in conjunction with the accompanying drawings in which.

DESCRIPTION OF THE PREFERRED EMBODIMENT

Figure 1:
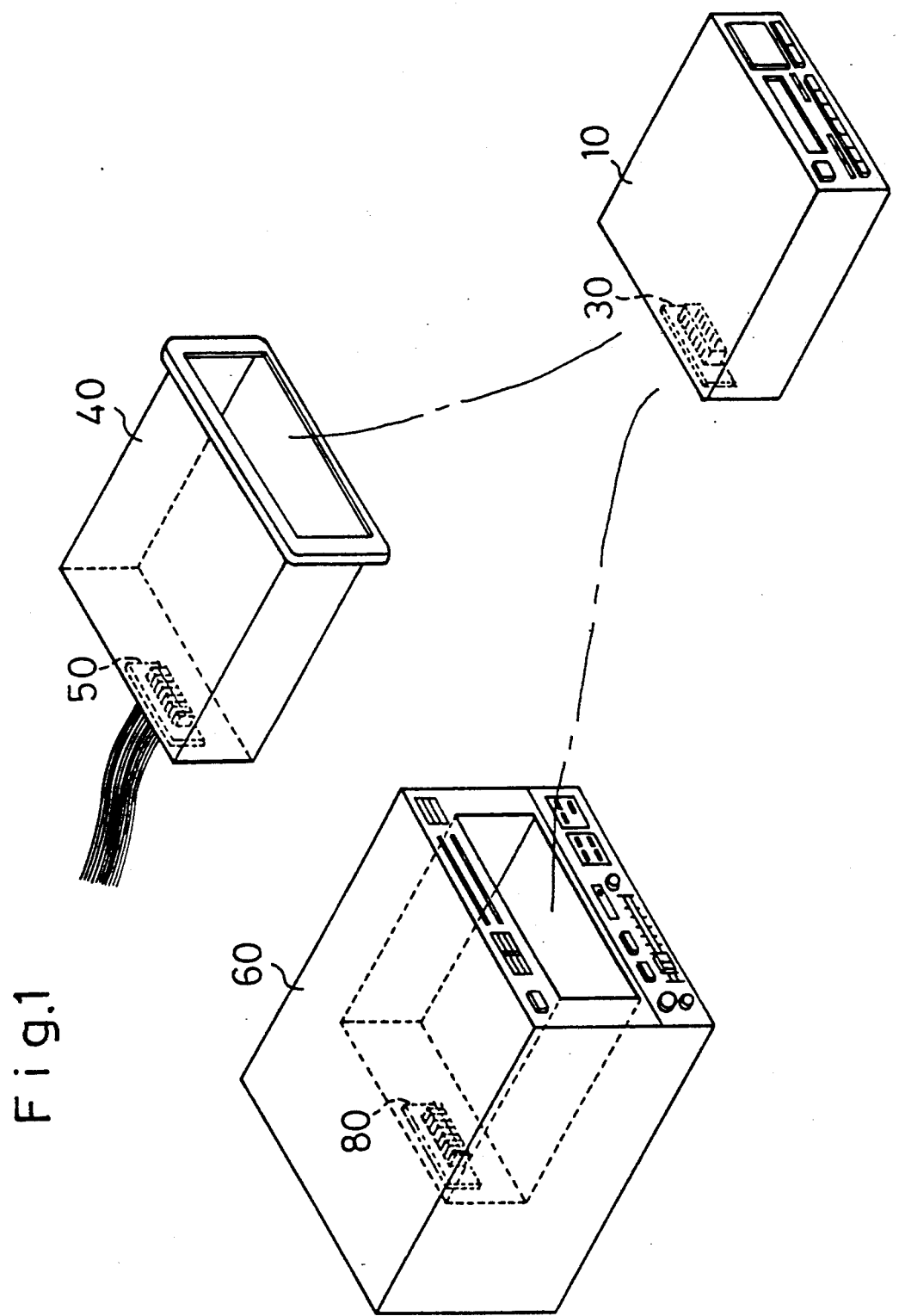
FIG. 1 is a general view showing a DAT system embodying the invention which comprises a DAT unit fittable into a selective one of a sleeve mounted in a dashboard of an automobile and a household cabinet.

Referring specifically to FIG. 1, a DAT system embodying the invention comprises a DAT unit 10 having the reproducing mechanism which is fittable to a sleeve 40 arranged within an opening in the dashboard of an automobile. DAT unit 10 may also be cooperated with a household cabinet 60 to to serve as a reproducing and recording apparatus when fitted to the latter.

Figure 2:
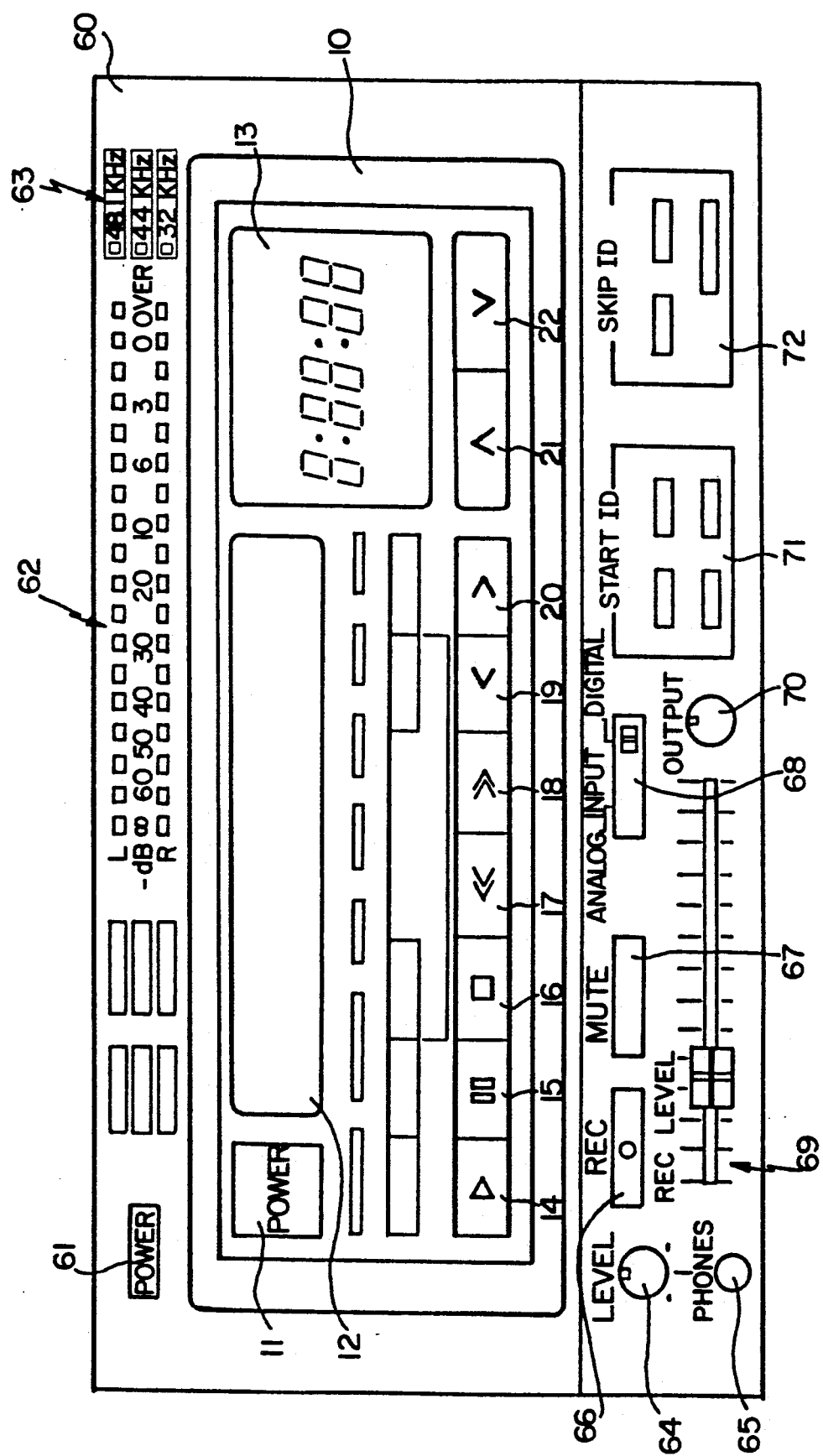
FIG. 2 is a diagrammatic view showing the front panel arrangement when DAT unit is fitted to the cabinet.

FIG. 2 illustrates the front panel arrangement of the system when DAT unit 10 is fitted into the cabinet 60. The front panel of DAT unit 10 includes a power switch 11, an opening 12 for loading and unloading a DAT cassette (not shown) and a display section 13 for displaying various information such as a playing time and the number of programs. A number of manipulation keys required for reproducing operation are also arranged on the front panel, including a play key 14, a pause key 15, a stop key 16, a pair of skip keys 17 and 18, a FF (fast forward) key 20 and a REW (rewind) key 19, up and down keys 21 and 22 for adjustment of frequency and output volume. At the rear of DAT unit 10 is provided a connector socket 30 having a terminal arrangement to be described later, which will come into engagement with a connector plug 50 of the sleeve 40 when DAT unit 10 is fitted to the sleeve 40, or a connector plug 80 of the cabinet 60 when fitted thereto.

On the front panel of the cabinet 60 there are arranged a power switch 61, a level meter 62, an indicator 63 of a sampling frequency, a knob 64 for adjustment of headphone volume monitoring, a headphone connecting jack 65, a REC (recording) key 66, a mute key 67, an analog/digital input select switch 68, a pair of sliding knobs 69 for adjustment of an input volume for the left and the right channels respectively, a knob 70 for adjustment of output volume, push keys 71 and 72 for designation of start and skip ID's. These operational keys are required for recording the input signal on a tape of DAT cassette which has been installed on DAT unit 10 through the opening 12.

Figure 3:
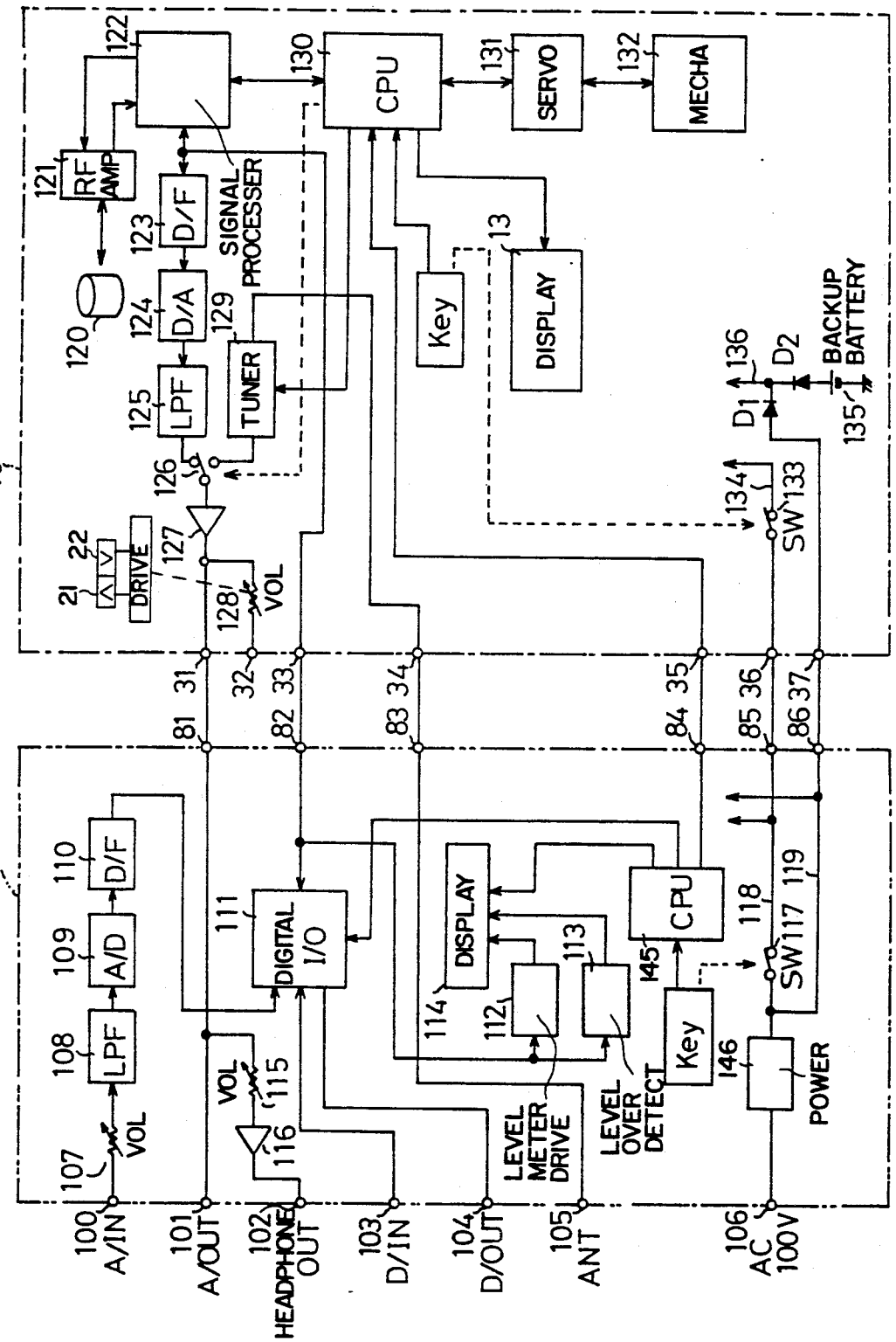
FIG. 3 is a block diagram of the system when DAT unit is fitted to the cabinet, in which case the system can be operated to perform recording operation on a DAT cassette tape installed in DAT unit, as well as reproducing operation of the tape.

With DAT unit 10 mounted in the cabinet 60, these units are electrically connected to each other by means of the plug-socket arrangement of 30 and 80 as shown in FIG. 3. An analog signal input through an analog input terminal (A/IN) 100 arranged on the cabinet 60 is supplied, via an input volume control 107 comprising a variable resistor which is in turn controlled by sliding operation of the knobs 69 (FIG. 2), to a low-pass filter (LPF) 108 where unnecessary components of high frequency is removed from the signal. The analog signal is then converted to a digital signal by an analog/digital converter (A/D) 109. The digital, pulse-code-modulation (PCM) signal thus obtained is transmitted to a digital input/output (I/O) 111 via a digital filter (D/F) 110. There is another digital signal input through a digital input terminal (D/IN) 103, which is directly input to the digital I/O 111. One of these two digital signals will be output from the digital I/O 111.

The digital signal output from the digital I/O 111 is supplied to a level meter drive circuit 112 which will be operated to indicate the signal strength at the level meter 62 arranged on the front panel of the cabinet 60. At the same time, the digital signal is sent to an input-over level detect circuit 113 which will lighten a warning indicator of the level meter 62 when the recording signal strength exceeds a predetermined level, that is 0 dB in this embodiment.

The digital signal output from the digital I/O 111 is, in turn, supplied to a signal processor 122 arranged in DAT unit 10 when it is fitted in the cabinet 60 so that corresponding terminals 82 and 33 of the plug-socket arrangement 80 and 30 are connected to each other. After the signal is processed for recording on DAT tape, it is output from the signal processor 122 to a radio frequency (RF) amplifier 121 and then input to a magnetic head (not shown) mounted in a rotary drum 120 so that the digital signal is recorded on DAT tape in a known manner.

The digital output signal supplied to DAT unit 10 is also supplied through a digital filter (D/F) 123 to a digital/analog converter (D/A) 124 where it is converted to an analog signal. The analog signal passes through a LPF 125, a switch 126 and a pre-amplifier 127 in DAT unit 10, a terminal 31 of the socket 30, and a terminal 81 of the plug 80 to enter the cabinet 60. The analog signal is thus directly output through an analog output terminal (A/OUT) 101 and, on the other hand, output through a headphone output terminal 102 via a volume control 115 comprising a variable resistor which is controlled by the knob 64 and pre-amplifier 116. The analog signal will be used as a monitor signal when recording.

In the reproducing condition, a digital signal reproduced by the magnetic head of the drum 120 is input through RF amplifier 121 to the signal processor 122 where the signal is processed to be reproduced. The digital output signal from the signal processor 122 is converted to an analog signal at D/A converter 124 and supplied to the output terminals 101 and 102 respectively through the signal transmission route described above. To A/OUT terminal 101 is connected an analog input terminal of a pre/main amplifier or a pre-amplifier (not shown). The analog signal output from the pre-amplifier 127 is also supplied through an output volume control variable resistor 128 to an output terminal 32 of the socket 30, which will not be connected to any of the terminals of the plug 80 when DAT unit 10 is fitted into the cabinet 60.

The digital output signal from the signal processor 122 is, through socket terminal 33 and the plug terminal 82 and the digital I/O 111, transferred to a digital output terminal (D/OUT) 104 of the cabinet 60. D/OUT terminal 104 can be connected to a digital input terminal of a preamplifier or a pre/main amplifier (not shown) including a D/A converter so that an analog signal output from the D/A converter will be reproduced for playing. Alternatively, D/OUT terminal 104 can be connected to a digital input terminal of another DAT player (not shown) for direct dubbing from digital to digital between separate two DAT units. In the cabinet 60, the digital output signal is also sent to the level meter drive circuit 112 and the over-level detect circuit 113 for indication of the signal level on the level meter 62 which is referred to in general as a display 114 in FIG. 3.

In the embodiment illustrated, DAT unit 10 also includes a tuner 129 which is connected to an antenna terminal (ANT) 105 of the cabinet 60 through terminals 34 and 83 when these are coupled by way of the plug-socket arrangement 30 and 80. The switch 126 is operated in response to a control signal output from a central processing unit (CPU) 130 to be described later, to transmit a selective one of the tape reproducing signal and the radio receiving signal towards the successive transmission line starting from the pre-amplifier 127.

Central processing units (CPU) 130 and 145 are respectively provided in DAT unit 10 and the cabinet 60 for controlling the tape recording, tape reproducing and radio receiving conditions. More particularly, CPU 130 in DAT unit 10 will be operated in response to signals which will be supplied by corresponding key operation, to thereby control operation of DAT unit 10, including switching of the recording/reproducing condition of the signal processor 122, switching of the recording/reproducing condition of a servo-circuit 131 which is in turn adapted to control a drive mechanism 132, indication at the display 13, a frequency of a channel selected by the tuner 129 and switching of the switch 126. Similarly, CPU 145 in the cabinet 60 will be operated in response to signal generated by operation of keys arranged on the front panel of the cabinet 60, to thereby control operation of the cabinet 60, including switchover of the digital signal to be input to the digital I/O 111 responsive to a position of an analog/digital input select switch 68 (FIG. 2) when recording, and indication at the display 114.

These two CPU's 130 and 145 are connected to each other by corresponding terminals 35 and 84 of the socket 30 and the plug 80 when DAT unit 10 and the cabinet 60 are in an assembled condition. By such connection, operation of DAT unit 10 can be controlled by key manipulation at the cabinet 60, and vice versa. For example, when the recording switch 66 arranged on the front panel of the cabinet 60 is depressed, a signal is supplied through CPU 145 to CPU 130 so that the signal processor 122 and the servo-circuit 131 will be switched to their conditions suitable to the recording operation.

An AC 100 V power is supplied through a terminal 106 to the cabinet 60 and rectified to a predetermined DC voltage at a power supply 146. When the power switch 61 is depressed to turn a switch 117 on, the voltage is supplied to respective circuits mounted in the cabinet 60 through a power supply line 118. Further, the power is constantly supplied through another line 119 to CPU 145 so that the respective conditions in the cabinet 60 which have been effected before the switch 117 is last turned off can be stored in CPU 145.

With DAT unit 10 assembled in the cabinet 60, the power is also supplied to respective circuits in DAT unit 10 through the switchable line 118, terminals 85 and 36 of the plug-socket arrangement, a power switch 133 and a power supply line 134. Since CPU's 115 and 130 are connected and cooperated to each other as having been described, the power switches 117 and 133 in the cabinet 60 and DAT unit 10 respectively will be turned on/off at the same time when one of the switch keys 11 and 61 is manipulated by the operator. The other, unswitchable power supply line 119 is also connected to DAT unit 10 through a plug terminal 86 and a socket terminal 37 coupled to each other, whereby the power is supplied to the tuner 129 and CPU 130 via a diode $D_1$ and a line 136. To the power supply line 136 is also connected a backup battery 135 via another diode $D_2$ so that data stored in the tuner 129 and CPU 130 can be kept in a backup memory even when DAT unit 10 is not energized in the course of transportation from the sleeve 40 to the cabinet 60, and vice versa. The voltage of the backup battery 135 will be of a value lower than that of the voltage supplied through the diode $D_1$ so that the voltage is not supplied from the battery 135 when DAT unit 10 is fitted in the cabinet 60.

Figure 4:
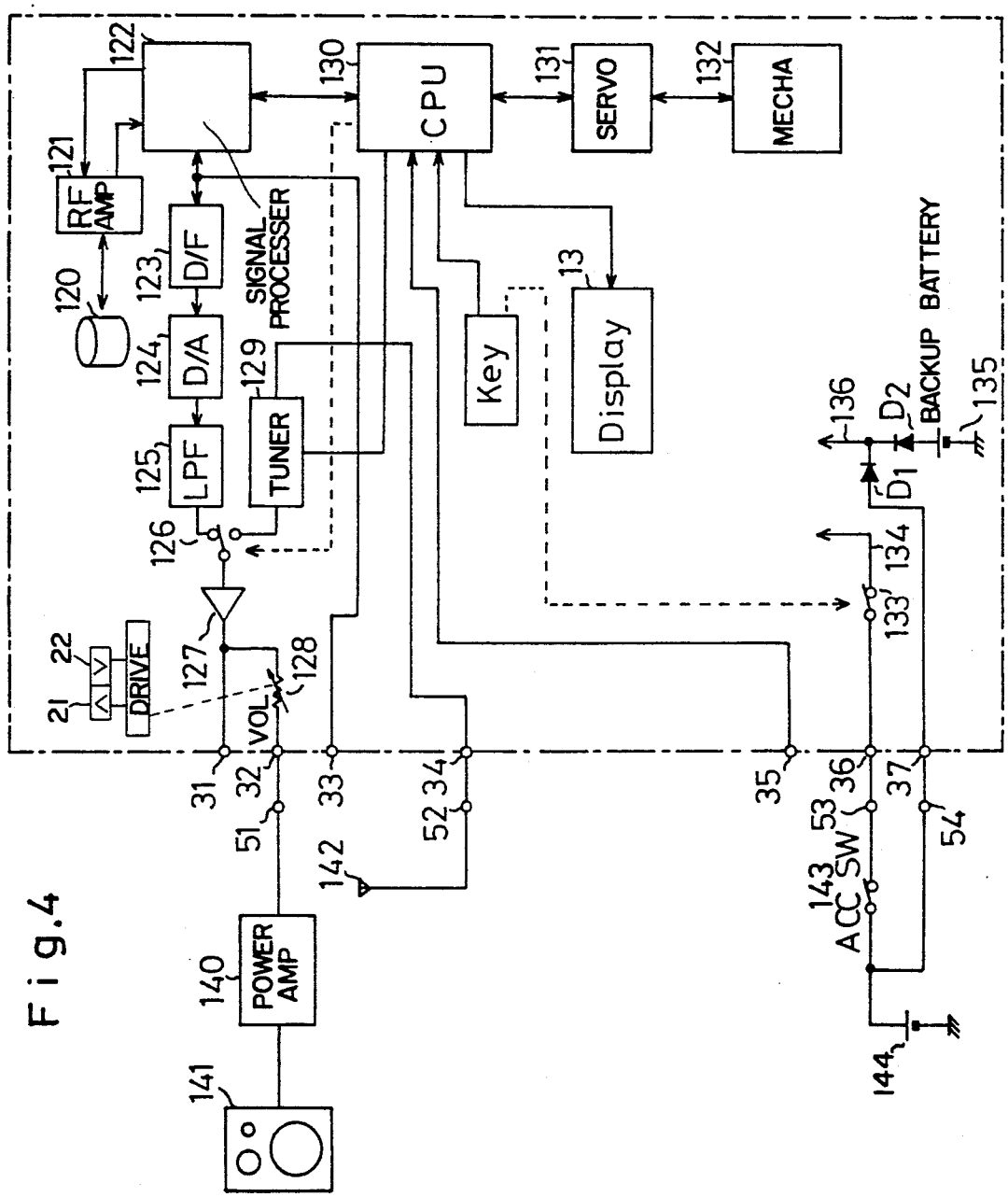
FIG. 4 is a block diagram of the system when DAT unit is fitted to the sleeve in the automobile, in which case the system serves only as a reproducing apparatus.

Referring now to FIG. 4, with DAT unit 10 installed within the sleeve 40 in the automobile, no recording operation will be performed and a selective one of the tape reproducing signal and the radio receiving signal can be output. One of the signals will be selected by the switch 126 which is operated responsive to a control signal supplied from CPU 130 by corresponding key manipulation.

The output signal thus selected will then passes the pre-amplifier 127 and supplied to the first output terminal 31 of the socket 30 as well as to the second output terminal 32 via the output volume 128. When DAT unit 10 is installed within the sleeve 40, an input terminal 51 of the connector plug 50 provided on the rear panel of the sleeve 40 is connected to the second output terminal 32, whereby the analog signal output therethrough is amplified by a power amplifier 140 mounted in a trunk, for example, of the automobile and then output to speaker units 141 mounted on the interior of the automobile. The power amplifier mounted in the automobile will normally be provided with no volume control means so that it is necessary to utilize the second output terminal 32 in which case the volume control operation can be effected by the output volume 128 which is in turn controlled by manipulation of the keys 21, 22 (FIG. 2). The first output terminal 31 is not utilized in this case.

An automobile antenna 142 is connected to the antenna input terminal 34 of the socket 30 through a terminal 52 of the plug 50 for transmitting the radio signal received thereat to the tuner 129 in DAT unit 10.

An electric power is supplied from a battery 144 mounted in the automobile. The power is supplied, when an accessary switch 143 and the switch 133 are both turned on, to the supply line 134 in DAT unit 10 through connection of a plug terminal 53 and the socket terminal 36. The power is also supplied directly to the diode $D_1$ in DAT unit 10 through connection between a plug terminal 54 and the socket terminal 37.

With DAT unit 10 fitted in the sleeve 40, the tape reproducing and the radio receiving will be controlled by CPU 130 in the same manner as in the case where DAT unit 10 is installed in the cabinet 80, as described before. In the case of FIG. 4, the input terminal 33 of DAT unit 10 which is required for inputting the digital signal to be recorded on DAT tape will not be utilized. The terminal 35 for CPU interconnection will also be vacant.

It is to be understood that the invention is not limited to the particular embodiment illustrated hereinbefore and many modifications and variations may be made without departing from spirits and scope of the invention as defined in the appended claims. DAT unit may be equipped with no tuner section. The level meter in the cabinet may be driven in response to the analog signal to indicate the recording level.

What is claimed is:

1. DAT system comprising:
   (i) a first unit including an opening for loading and unloading a DAT tape cassette, a recording/reproducing magnetic head for recording a digital signal on a recording tape of said DAT tape cassette as well as for reproducing a digital signal recorded on said recording tape, a signal processor for processing the digital signal to be recorded/reproduced, first control means for controlling operation of said signal processor, and a digital/analog converter for converting the digital signal output from said signal processor to an analog signal;
   (ii) a second unit adapted to accommodate said first unit and including an analog/digital converter for converting an analog signal to a digital signal, a digital input/output for transmitting and receiving the digital signal, and second control means for controlling operation of said digital input/output;
   (iii) first connecting means for electrically connecting said first and second units when the former is fitted to the latter, including digital signal connecting means for supplying the digital signal output from said digital input/output in said second unit to said signal processor and said digital/analog converter in said first unit when recording, as well as for supplying the digital signal output from said signal processor in said first unit to said digital input/output in said second unit when reproducing, analog signal connecting means for transmitting the analog signal output from said digital/analog converter in said first unit to an analog output terminal of said second unit to be output therethrough when reproducing, control signal connecting means for transmitting and receiving control signals generated from said first control means in said first unit and said second control means in said second unit; and (iv) second connecting means for connecting said first unit to playing instrumentality, including an analog signal connecting means for connecting the analog signal output from said digital/analog converter in said first unit to said playing instrumentality for playing of the reproduced signal.

2. DAT system according to claim 1 wherein said digital input/output in said second unit is operated in response to the control signal from said second control means, to thereby select one of the digital signals, one being supplied from said analog/digital converter and the other being directly input through a digital signal input terminal provided for said cabinet, said selected digital signal being supplied to said signal processor and said digital/analog converter in said first unit through said first connecting means, when recording.

3. DAT system according to claim 1 wherein said first unit further includes a tuner, and said first and second connecting means further include respectively means for connecting said tuner to an antenna.

4. DAT system according to claim 2 wherein said first unit further includes switch means for supplying a selective one of the analog signal output from said digital/analog converter and the radio receiving signal from said tuner, to said analog signal connecting means in said first or second connecting means, said switch being controlled by the control signal generated from said first control means.

5. DAT system according to claim 1 wherein said second unit further includes a power supply, and said first connecting means further includes power connecting means for supplying a power from said power supply to said first unit.

6. DAT system according to claim 5 wherein said first unit further includes backup battery for supplying a power at least to said first control means when said first unit is not connected to said first or second connecting means.

* * * * *